United States Patent [19]

Lauck et al.

[11] 4,399,164

[45] Aug. 16, 1983

[54] PREPARATION OF A DRIED BLEND OF WHEY BY-PRODUCT AND CASEIN OR ITS SALTS

[75] Inventors: Robert M. Lauck, New City; Nicholas Melachouris, White Plains, both of N.Y.

[73] Assignee: Nutrisearch Company, Cincinnati, Ohio

[21] Appl. No.: 194,513

[22] Filed: Oct. 6, 1980

Related U.S. Application Data

[60] Division of Ser. No. 6,817, Jan. 26, 1979, Pat. No. 4,259,363, which is a continuation of Ser. No. 836,164, Sep. 23, 1977, abandoned, which is a continuation-in-part of Ser. No. 751,821, Dec. 17, 1976, abandoned.

[51] Int. Cl.$^3$ .......................... A23C 21/06; A23J 1/22
[52] U.S. Cl. .................................. 426/583; 426/646; 426/657; 426/471
[58] Field of Search .............. 426/583, 580, 471, 657, 426/646

[56] References Cited

U.S. PATENT DOCUMENTS

| | | | |
|---|---|---|---|
| 3,708,307 | 1/1973 | Lundstedt | 426/583 X |
| 3,911,143 | 10/1975 | Colmey et al. | 426/583 |
| 3,930,056 | 12/1975 | Feminella et al. | 426/583 X |
| 3,934,051 | 1/1976 | Eastin | 426/646 X |
| 4,118,514 | 10/1978 | Hoseney et al. | 426/583 X |
| 4,182,777 | 1/1980 | Saunders et al. | 426/583 X |
| 4,269,864 | 5/1981 | Chirafisi et al. | 426/583 |

*Primary Examiner*—David M. Naff
*Attorney, Agent, or Firm*—Cushman, Darby & Cushman

[57] ABSTRACT

A dried blend of deproteinized whey by-product and casein or its salts is produced by forming an admixture of 5 to 50% of casein, sodium caseinate or potassium caseinate and a deproteinized whey by-product selected from the group consisting of (1) the low molecular weight fraction obtained by gel fractionation of whey, (2) the permeate resulting from the ultrafiltration concentration of whey and (3) the delactosed permeate resulting from the ultrafiltration concentration of whey, and drying the admixture, preferably by spray drying. The dried blend has reduced hygroscopicity, and is useful in food products as a flavor enhancing agent, flavor agent or binding agent.

2 Claims, No Drawings

PREPARATION OF A DRIED BLEND OF WHEY BY-PRODUCT AND CASEIN OR ITS SALTS

This application is a divisional of U.S. application Ser. No. 6,817, filed Jan. 26, 1979, now U.S. Pat. No. 4,259,363, which in turn is a continuation of Ser. No. 836,164, filed Sept. 23, 1977, now abandoned, which in turn is a continuation-in-part of Ser. No. 751,821, filed Dec. 17, 1976, now abandoned.

BACKGROUND OF THE PRESENT INVENTION

This invention relates to the extension and flavor enhancement of comminuted meats using blends of delactosed or deproteinized whey solids obtained from by-product solutions resulting from the concentration of whey protein and casein or its salts.

This invention also relates to a new process for drying by-product solutions obtained from concentrating whey protein by means of ultrafiltration or gel filtration and the dried product obtained thereby.

Because of the increasing requirement for protein sources throughout the world, various processes have been recently developed to extract protein from whey. Particular reference is made to the Dienst Attebery U.S. Pat. No. Re. 27,806, which discloses a method of separating protein from cheese whey by means of a molecular sieve resin, more commonly known as gel filtration. Also in active use is the technique of ultrafiltration to separate and concentrate the protein from the whey. The development of the separation techniques has also raised further processing problems. The by-products from these processes are not adaptable to present known techniques of material handling.

In the processing of cheese whey by molecular sieve resin, a low molecular weight fraction (about 5-10% solids) is obtained which has a solids composition of mainly lactose and minerals with residual protein. The solids in this low molecular weight fraction can be described more particularly by the following typical chemical analysis.

| | |
|---|---|
| Lactose, % | 40-50 |
| Minerals, % | 25-35 |
| Protein (N × 6.38), % | 15-20 |
| Lactic Acid, % | 7-10 |
| Citric Acid, % | 3-6 |
| Fat, % | less than 1 |
| Moisture | less than 5 |
| pH | 6.6-7.2 |

Similarly, the use of ultrafiltration provides a permeate which is high in minerals and lactose. The solids in the permeate can be described more particularly by the following typical chemical analysis.

| | |
|---|---|
| Lactose, % | 70-80 |
| Minerals, % | 10-15 |
| Protein, (N × 6.38), % | 4-8 |
| Lactic Acid, % | — |
| Citric Acid, % | — |
| Fat, % | less than 1 |
| Moisture | less than 5 |
| pH | 6-7 |

Two primary problems have been associated with the conventional drying of the low molecular weight fraction and the permeates. First of all, conventional drying techniques cannot be utilized as effectively due to undersirable particle adherence to the walls. Particle adherence to the drier walls tends to cause general inefficient drier operation as well as burnt particles in the final product.

The second problem associated with these products is the undesirable level of hygroscopicity exhibited by these products. More specifically, the hygroscopicity of the product adversely affects product packaging in that the dried particles exhibit such undesirable fluid characteristics that packaging as for example, bagging, becomes difficult to accomplish using common industry equipment. Also, the undesirable level of hygroscopicity tends to detract from potential use of this product in food applications. Once the package is opened, the dried particles immediately absorb moisture and cake.

An improved process for drying a mineral containing aqueous protein solution is disclosed in U.S. Pat. No. 3,840,996. In this patent, the low molecular weight by-product fraction from the gel filtration of the whey is admixed with drying agents selected from the group consisting of tricalcium phosphate, dicalcium phosphate, kaolin, diatomaceous earth, silica gel, calcium silicate hydrate, or mixtures thereof and spray dried. This product is useful in flavor-enhancing various foods.

The use of the by-product of the molecular sieve fractionation of whey as a flavor enhancer in foods is taught in U.S. Pat. No. 3,930,056. In addition, this patent teaches that the by-product of the molecular sieve fractionation of the whey is useful in comminuted meat compositions as it exhibits a binding effect in addition to the flavor enhancement effect. While the by-product from the molecular sieve fractionation of whey is an effective meat binder and flavor enhancer is comminuted meats, there still exists areas under the broad term of comminuted meat where less than excellent performance is achieved. This generally includes the area of sandwich loaves.

In preparing sandwich loaves, the binder must emulsify the fat and water in contrast to franks where there is more latitude on water loss. Whey by-products have not been effective in extending sandwish loaves though the by-products can be used effectively in franks.

It has now been found that more effective extension of comminuted meat on a broad scale can be accomplished in accordance with the invention. It has also been found that the drying problems of the delactosed or deproteinized whey solutions obtained as the by-products of whey protein concentration can be alleviated.

BRIEF SUMMARY OF THE INVENTION

In accordance with the present invention, it has now been found that the extension of comminuted meats can be improved by using as binder therefor a blend of deproteinized or delactosed whey by-products and casein or its sodium or potassium salts. The flavor of the comminuted meats is also enhanced by the use of these blends.

Further, there is provided an improved process for drying delactosed or deproteinized whey by-product solutions which comprises admixing with the solution from about 5% to about 50% by weight of casein or its salts such as the sodium and potassium salts thereof prior to drying. The solutions are particularly adapted for spray drying. Reduced hygroscopicity has also been found. The percentage is based on the dry solids in the final dried product.

An effective meat binder and flavor enhancer can also be obtained by dry blending dried delactosed or deproteinized whey by-products with casein or its salts.

The dried products of the present invention can be used broadly as food additive agents, i.e., protein enrichers or flavor enhancers. The products are particularly adapted for use as flavor enhancers and meat binders in comminuted meats.

DETAILED DESCRIPTION OF THE PRESENT INVENTION

The dried products of the present invention are blends of delactosed or deproteinized whey solids with from about 5% to about 50% by weight of casein or its salts. These blends can be prepared by dry blending the ingredients. Preferably, the blends are prepared by codrying a delactosed and/or deproteinized whey by-product solution with the casein or its salts. The codried blends are more easily handleable and show a reduced hygroscopicity over the dried delactosed or deproteinized whey itself. The following description will be directed to the preferred codried blend, it being understood that the disclosure also applies to the dry blend of the dried delactosed or deproteinized whey and casein and its salts.

The dried products used in the present invention are based on certain dried delactosed and/or deproteinized whey by-product solutions. These by-product solutions can be derived from either acid or sweet cheese whey which has been processed to remove all or a part of the lactose or protein content thereof. As used herein, the term "whey by-products" is intended to encompass the second fraction obtained from the molecular sieve separation of cheese whey as described in U.S. Pat. No. Re. 27,809, the permeate obtained from the ultrafiltration concentration of protein from whey, and delactosed permeate.

Preferably, the low molecular weight second fraction is the material obtained by passing a partially delactosed cheese whey mother liquor through a bed of molecular sieve resin in accordance with U.S. Pat. No. Re. 27,809 and recovering, for purposes of this invention, the low molecular weight second fraction containing mainly lactose, minerals and residual protein. The partially delactosed whey mother liquor is obtained by concentrating raw cheese whey by conventional means to a solids concentration of about 60%, reducing the temperature of the concentrate to induce lactose crystallization and thereafter separating crystalline lactose from the liquid by conventional means.

If desired, the whey can be pretreated to clarify the whey using processes such as illustrated by that disclosed in U.S. Pat. No. 3,060,219. In accordance with this patent, lipid is removed as a precipitate from whey by treating the whey solution with a calcium ion at approximately a neutral pH.

Preferably, the whey stream used in the gel filtration fractionation of whey is clarified prior to delactosing. The preferred method of clarification is the process described in U.S. Pat. No. 3,060,219.

Also effective in the present invention is the permeate obtained from the ultrafiltration of cheese whey. Ultrafiltration membranes are utilized to separate the high molecular weight fraction of the whey (the protein) from the liquid and low molecular materials, i.e., the lactose and ash in the whey solution. The protein enriched solution is retained on the membrane and it is called the retentate. The water and low molecular weight fraction passes through the membrane and is called the permeate. An illustrative method for ultrafiltration is described by Horton, B. S. et al., Food Technology, Vol. 26, page 30, 1972.

In an illustrative method for ultrafiltering cheese whey, an acid or cottage cheese whey concentrate containing from about 40 to about 60% and preferably 50%±5% whey protein is prepared by neutralizing acid whey to a pH of 6.5 with caustic. After storage, the pH is then adjusted to 7.2 and any solids or precipitates are removed by centrifugal clarification. The clarified liquor is then pasteurized and fed into the ultrafiltration membrane unit. The retentate is condensed and spray dried. The liquid permeate is then used in the process of the present invention.

The permeate can be dried as is or concentrated and/or delactosed by concentration and cooling to effect a precipitation of a lactose. The permeate is a deproteinized whey solution and the delactosed permeate is a delactosed deproteinized whey solution.

The raw cheese whey source used in preparing the materials used in the present invention can be acid cheese whey, sweet cheese whey, or mixtures thereof. More particularly, the raw cheese whey can be cottage cheese whey, casein cheese whey, cheddar cheese whey, mozarella cheese whey, Swiss cheese whey or mixtures thereof. Preferably, raw cheese whey used in connection with the molecular sieve fractionation is a blend of cottage cheese whey and cheddar cheese whey. The preferred cheese whey for use in the ultrafiltration fractionation of whey is acid cheese whey.

In accordance with the present invention, casein or its sodium or potassium salts are added to the liquid whey solution or the dry whey solids in an amount of from about 5% to about 50% and preferably from about 5% to about 40% by weight based on the total weight of the dry solids in the whey solution or the weight of the dry solids. The casein salts can be added as the performed sodium or potassium salt or by dissolving casein by pH adjustment of the water suspension of the whey protein by-product solution. Casein itself can be used though this is less preferred. It is most preferred that sodium caseinate be utilized in an amount ranging from about 5% to about 40%. If a product for a low sodium diet is required, potassium caseinate can be used.

The blend of the caseinate and the whey protein solution can be dried by any known means. Preferably, an atomizing type dryer is utilized. By atomizing dryer is meant any conventional dryer which effect drying of liquid by reducing or atomizing the liquid feed stream containing dissolved or suspended solids to droplet form in the presence of a drying atmosphere. This type of dryer is illustrated by a spray dryer, fluid bed dryer or flash or vacuum dryer. More particularly, the term spray dryer includes vertical spray dryers, horizontal spray dryers and filter mat dryers. The atomizing dryer generally includes a main drying chamber, an atomizer, e.g., a spray nozzle, adapted to feed the material to be dried into a drying atmosphere in the drying chamber. As used herein, drying atmosphere is also intended to cover a negative pressure atmosphere such as used in a flash or vacuum evaporator.

In a conventional spray dryer, the inlet air stream is generally heated to effect drying. The inlet temperature is usually heated within the range of from about 335° F. to about 360° F. The corresponding outlet temperature usually ranges from about 230° F. to about 240° F. The temperature in the dryer is not critical with the exception that the temperature must be high enough to effectively dry the product yet insufficient to cause burning or browning. The parameters of the dryer as well as the conditions generally employed such as feed rate, residence time and the like can be easily discerned by one skilled in the art.

If desired, one can also include a small proportion of a drying agent or a flow control agent selected from the group consisting of tricalcium phosphate, dicalcium phosphate, kaolin, diatomaceous earth, silica gel, calcium silicate hydrate and mixtures thereof.

The blend of the whey solution and the caseinate dries with greater facility and is less hydroscopic allowing it to be more easily bagged. The product is substantially non-caking which facilitates the use of the product.

In accordance with the present invention, blends of the present invention can be used in food products as a flavor enhancing agent, flavor agent or a binding agent. More specifically, it has been found that the blend derived from the present invention can be used in meat products, for example, soups, stews, gravies, breadings, batters, beef patties and imitation sausages. Also, the product can be used in chip dips, cheese spreads, process cheese foods, spray dried cheeses and the like.

The blends described hereinbefore can be effectively added to comminuted meats as a meat binder and flavor enhancer. The comminuted meat product so produced shows an improved flavor over like products extended in the usual manner.

By comminuted meat is meant herein, comminuted meat food products prepared from one or more kinds of skeletal muscle meat or skeletal muscle meat and poultry meat. Cooked sausage can be defined as those comminuted meat products defined by the United States Department of Agricultural in 9 C.F.R., Section 319.180, for example, frankfurter, weiner, bologna, garlic bologna, knockwurst and similar products. In addition to the sausage products described above, comminuted meat further includes beef patties (9 C.F.R., Section 319.15).

It has been found that the products of the present invention are particularly effective in flavor enhancing and extending non-specific loaves as defined in 9 C.F.R., Section 319.280.

These include the luncheon meat loaves which are generally chopped or ground meat of pork, beef, veal or lamb molded into a square shape and which can contain cereals, soy and non-fat dry milk as well as other non-cereal extenders and if desired, flavorings such as chopped nuts, olives, cooked maccaroni, pistachio nuts, dried cheese and the like. The meat binder for these loaves is generally non-fat dried milk. Effective emulsification of the comminuted meat used in preparing these loaves can be accomplished using the blends as described hereinbefore in place of all or a portion of the non-fat dried milk normally used.

The blends described hereinbefore can be added to comminuted meats in flavor enhancingly or meat bindingly effective amounts. The amounts necessary to effect binding, or flavor enhancement, are at times the same. Amounts ranging from about 1% to about 35% by weight based on the weight of the comminuted meat product can be used. In connection with cooked sausage, as defined above, the present legal limit for binders is 3.5% by weight. The blends of the present invention are effective in cooked sausage in place of known binders. In non-specific loaves as defined above, there is no legal limit on the amount of binder which can be used but the product must contain at least 65% meat. In non-specific loaves, it is preferred to utilize the binder in replacement amounts for the binders presently used (non-fat dried milk). The preferred amounts for non-specific loaves range from about 10 to about 20% by weight based on the final weight of the loaf. Since the blends of the present invention are compatible with existing binders, both total and partial replacements of existing binders are included within the present invention. Thus, combinations of the blends of the present invention with known binders, such as non-fat dried milk, can be made.

The blends of the present invention have also been found to be useful in other foods for other functional properties. Products of the present invention can be used as milk replacers in cakes.

It has also been found that the dry blend of the dried whey protein by-products and casein or casein salts are equally effective in providing the meat extension properties of the invention. As such, the dry blend products are also included the scope of the present invention for this stated purpose.

It has also been found that if the use of the delactosed or deproteinized by-product whey compositions and specifically the by-product from the molecular sieve fractionation of the whey along does not function as an acceptable meat binder, the blends of the present invention often will provide acceptable results. Also, and if the blends of the present invention do not provide acceptable results, the product without the casein often effectively does. Because of the wide range of meat product and their varying requirements, it is desirable to provide a system which can be adapted to any specific use. This can be accomplished in accordance with the present invention either by increasing or reducing the amount of casein or by blending the casein treated material with the non-casein treated material. Effective results can be achieved utilizing blends of the present invention in combination with up to 75% by weight of the non-casein treated material such that the total amount of casein or its salts is within the range of from about 5 to about 50% by weight based on the total weight of the composition, the percentage being on the dry weight of the final product.

It has also been found that the addition of other vegetable protein sources such as soy protein to the blend does not increase the effectiveness of the blend. It has been found that the soy acts as a filler and thereby decreases the functionality of the composition.

The blends of the present invention provide improved quality meats over and above the quality obtained using currently available meat binders. These improvements include water and flavor stabilization which are greater than with current binders such as non-fat dried milk.

The present invention is further illustrated in the examples which follow.

EXAMPLES 1-5

Various amounts of the second fraction obtained from the gel filtration concentration of whey protein (ENR-EX ®) available from Stauffer Chemical Company, Westport, Conn. and sodium caseinate were mixed and dissolved in 300 milliliters of water. The solutions so obtained were freeze dried. The liquefying of dry ENR-EX was a laboratory approximation of the liquid second product from the gel filtration of whey since the dry ENR-EX was the second product in dry form. All amounts are on a dry solids basis.

The following combinations were prepared:

| Example | 1 | 2 | 3 | 4 | 5 |
|---|---|---|---|---|---|
| ENR-EX, grams | 100 | 95 | 90 | 85 | 80 |
| Sodium Caseinate, grams | 0 | 5 | 10 | 15 | 20 |

After freeze drying, the ENR-EX sample alone could not be powdered and could not be handled. It was hygroscopic and caked. Overnight, it collapsed and turned to paste. At 5% caseinate, the dried product could be powdered in a mortar and pestle and was handleable. The dried samples containing 10%, 15% and 20% sodium caseinate could be powdered in an Osterizer blender. These samples flowed easily, were essentially non-hygroscopic and were more easily handleable.

EXAMPLES 6–7

Codried blends of ENR-EX and sodium caseinate or casein were prepared as follows:

EXAMPLE 6

75.68 grams of ENR-EX was added to 200 milliliters of water with stirring. 24.32 grams of sodium caseinate was then added with stirring. 100 milliliters of water was then added to reduce thickness.

EXAMPLE 7

73.85 grams of ENR-EX was added to 200 milliliters of water with stirring. 26.15 grams of casein was then added with stirring. The pH dropped to pH 6. The pH was titrated to pH 7 with one normal sodium hydroxide. The solution thickened with time. 100 milliliters of water was added to reduce the thickness. The pH was readjusted from pH 6.7 to pH 7 with additional amounts of the one normal sodium hydroxide.

Both solutions from Examples 6 and 7 were poured into crystallizing dishes, frozen and freeze dried.

EXAMPLES 8 and 9

Codried blends of the permeate and the delactosed permeate from the ultrafiltration of whey and sodium caseinate were prepared.

EXAMPLE 8

To 200 milliliters of cold liquid permeate obtained from the plant containing 5% protein, 10% ash, 94% moisture and 6% solids was added 6.88 grams of sodium caseinate. The amount of sodium caseinate added was 36.4% and the final dried blend had a protein content of 36%. The caseinate clumped on the top of the permeate and was dispersed by blending in a SERVALL ®Omni-Mixer.

EXAMPLE 9

To 200 milliliters of cold liquid delactosed permeate obtained from the plant was added 27.5 grams of sodium caseinate. The caseinate was dispersed in the Omni-Mixer. The amount of sodium caseinate added was 33% by weight and the final product had a protein content of 36%.

Both samples were placed in the freeze dryer and dried.

An attempt to dry delactosed permeate failed. The product was wet appearing as if all the water was not removed.

EXAMPLES 10–14

Blends of the second fraction obtained from the gel filtration concentration of whey protein (ENR-EX ®) available from Stauffer Chemical Company, Westport, Conn. with sodium caseinate were used in place of non-fat dried milk in meat emulsions for non-specific meat loaves.

Meat emulsions were prepared on a laboratory scale of 100 grams per batch in accordance with the process outlined by Lauck in Journal of Food Science, Volume 40, pages 736–740 (1975). Each batch contained 21.36 grams beef, 28.64 grams fat pork, 31.67 grams water, 1.66 grams of a combination of salt, sugar and sodium nitrite (7.8 milligrams) and 16.67 grams of the meat binder (non-fat dried milk or blends of the present invention).

The meat emulsions were prepared by placing room temperature water in the metal cup of a SERVALL-®Omni-Mixer followed by the meat binder, refrigerated meat ingredients and the dry ingredients (salt, sugar and sodium nitrite curing salt) in that order. The meat binders were predispersed in the water prior to adding the meat.

The cup containing the ingredients was attached to the Omni-Mixer and immersed in water at room temperature (19° C.). The meat was chopped at full power, with intermediate scraping, for consecutive periods of 5, 10 and 15 seconds, the 15 second period being conducted in three five second periods. The final emulsion temperature was recorded.

25 gram samples of the emulsions were stuffed into 40 milliliter glass centrifuge tubes and were cooked by immersing in a water bath at 82° C. for 30 minutes. These experiments were carried out both with and without prior refrigeration in 250 milliliter metal beakers covered with Saran wrap. The cooking schedule resulted in an internal emulsion temperature of about 79° C. when the emulsions were at refrigerator temperature (ca. 4°–5° C.) before cooking. The free liquid that formed after cooking was pressed with a rubber plunger into a graduated cylinder, and the volumes of free fat and water were recorded as a percent of the uncooked emulsion weight.

The time for emulsification is reported as five seconds plus 10 seconds plus n times 5 seconds. "n" is the number of five second chopping periods required to finish chopping the emulsion over the initial five second and 10 second chopping periods as judged by its appearance. The control required three extra five second chopping periods (n=3). Any sample which had a value of n greater than three was considered a failure.

The binder used and the results obtained are reported in Table I. As it can be seed from the results, the binders of Examples 11 and 12 extended the meat at the same rate as the control meat emulsion made using non-fat dried milk. Acceptable fat and water loss rates were obtained.

The use of ENR-EX alone as the binder did not work in non-specific loaves as can be seen from Example 14. After a total emulsification period of 55 seconds, the meat was still not emulsified. At the end of 45 seconds, the emulsion of Example 14 appeared thin.

The dry blend of Example 11 produced an emulsion with red chunks of meat in the emulsion. This was not noted in Examples 10, 12, 13 and 14. Red chunks are undesirable as it appears to the housewife that the meat is dried out and spoiled.

The sodium nitrite was not included in Example 14. This ommission should not affect emulsification.

The results are reported in Table I below.

TABLE I

| Example | 10 | 11 1 | 12 2 | 13 3 | 14 |
|---|---|---|---|---|---|
| Non-Fat Dried Milk, grams | 16.67 | — | — | — | — |
| ENR-EX, grams | — | 12.6 | 12.6 | 12.6 | 25 |
| Sodium Caseinate, grams | — | 4.07 | 4.07 | 4.07 | — |
| Salt, grams | 1.66 | .66 | .66 | .66 | — |
| Water, grams | 31.7 | 32.7 | 32.7 | 32.7 | 25 |
| Chopping Time | | | | | |
| 5 sec + 10 sec + n × 5 sec | 30 sec. | 30 sec. | 30 sec. | 30 sec. | over 55 sec. |
| n | 3 | 3 | 3 | 3 | over 8 |
| Emulsion Temperature, °C. | 24 | 22 | 25 | 26 | 25 |
| Initial Cook | | | | | |
| Fat Loss % | 0.6 | 0.6 | 0.4 | 0.4 | 4.8 |
| Water loss % | 8.8 | 10.8 | 8.4 | 7.2 | 1.6 |
| Cook after two Days Refrigeration | | | | | |
| Fat Loss % | 0.6 | 0.8 | 0.6 | 0.6 | 12.8 |
| Water loss % | 9.6 | 12 | 10 | 8.8 | 14.4 |

1 Dry blend
2 Codried ENR-EX - Sodium Caseinate blend of Example 6
3 Codried using neutralized solution with casein of Example 7

EXAMPLES 15–17

A dry blend of the second fraction obtained in gel filtration concentration of whey protein (ENR-EX ®) available from Stauffer Chemical Company, Westport, Conn. with sodium caseinate was used in place of non-fat dried milk in meat emulsions for non-specific meat loaves in accordance with the procedure of Example 10 with the exception that ice water rather than room temperature water was used in the water bath. For a control, the results of Example 14 are repeated for comparative purposes.

TABLE II

| Example No. | 15 | 16 | 17 | Control |
|---|---|---|---|---|
| Binder | | | | |
| NFDM (low heat) | 16.67 | — | — | Example 14 results repeated |
| ENR-EX | — | 12.17 | 14.64 | 25 |
| Caseinate | — | 4.5 | 2.03 | — |
| % Protein in Binder | 36% | 36% | 25% | — |
| Results | | | | |
| Initial Cook | | | | |
| Fat Loss % | .1 | .25 | .3 | 4.8 |
| Water Loss % | 1.2 | 2.7 | 4.2 | 1.6 |
| Remarks | Moderately Smooth White | Moderately Smooth Chunks of Meat | Moderately Smooth | Thin chop, did not emulsify, water grainy |
| Overnight Refrigeration | | | | |
| Fat Loss % | .1 | .2 | .2 | — |
| Water Loss % | 1.2 | 2.4 | 3.1 | — |
| Remarks | Moderately Smooth | Slightly Smooth | Moderately | |

TABLE II-continued

| Example No. | 15 | 16 | 17 | Control |
|---|---|---|---|---|
| | | | | White Came Apart When Taken from Tube |
| | | Chunks | Smooth | |
| Cook After two days refrigeration | | | | |
| Initial | | | | |
| Fat Loss % | 0.4 | 0.4 | 0.4 | 12.8 |
| Water Loss % | 6.8 | 7.2 | 6.4 | 14.4 |
| After overnight Refrigeration | | | | |
| Fat Loss % | 0.4 | 0.6 | 0.6 | — |
| Water Loss % | 8.4 | 12.4 | 11.6 | — |

As can be seen from the results set forth in Table II, the products of the invention found the meat in contrast to the use of ENR-EX alone which did not emulsify the ingredients of the non-specific loaves. The products of the present invention provided water loss and fat loss within an acceptable range to the non-fat dried milk control.

The invention is defined in the claims which follow.

What is claimed is:

1. A process for preparing a dried blend of a deproteinized whey by-product and a member selected from the group consisting of casein, sodium caseinate and potassium caseinate, said process consisting of admixing a deproteinized whey by-product solution with about 5 to 50 percent by weight of said casein, sodium caseinate or potassium caseinate based on the total weight of dry solids in said whey by-product solution and drying said admixture to provide said dried blend, said deproteinized whey by-product being selected from the group consisting of
    (1) a low molecular weight fraction containing about 5–10% solids resulting from the separation of protein from cheese whey using a molecular sieve resin, the solids comprising 40–50% lactose, 25–35% minerals, 15–20% protein (N×6.38), 7–10% lactic acid, 3–6% citric acid, less than 1% fat and less than 5% moisture
    (2) a low molecular weight fraction resulting from the ultrafiltration of whey to remove protein, the resulting solids comprising 70–80% lactose, 10–15% minerals, 4–8% protein (N×6.38), less than 1% fat and less than 5% moisture, and
    (3) the low molecular weight fraction of (2) above after being delactosed.

2. A process for preparing a dried blend of a deproteinized whey by-product and a member selected from the group consisting of casein, sodium caseinate and potassium caseinate, said process consisting of admixing a deproteinized whey by-product solution with about 5 to 50% of said casein, sodium caseinate or potassium caseinate based on the total weight of dry solids in said whey by-product solution and drying said admixture in an atomizing dryer, said deproteinized whey by-product being selected from the group consisting of (1) the low molecular weight fraction obtained by gel fractionation of whey, (2) the permeate resulting from the ultrafiltration concentration of whey and (3) the delactosed permeate resulting from the ultrafiltration concentration of whey.

* * * * *